(12) United States Patent
Kidd et al.

(10) Patent No.: US 7,698,086 B2
(45) Date of Patent: Apr. 13, 2010

(54) METHOD AND APPARATUS FOR OBTAINING AND USING EVENT DATA RECORDER TRIAGE DATA

(75) Inventors: Scott D. Kidd, San Antonio, TX (US); Darrin A. Smith, San Antonio, TX (US)

(73) Assignee: Injury Sciences LLC, San Antonio, TX (US)

( * ) Notice: Subject to any disclaimer, the term of this patent is extended or adjusted under 35 U.S.C. 154(b) by 556 days.

(21) Appl. No.: 11/511,823

(22) Filed: Aug. 29, 2006

(65) Prior Publication Data

US 2008/0126137 A1 May 29, 2008

Related U.S. Application Data

(60) Provisional application No. 60/811,973, filed on Jun. 8, 2006.

(51) Int. Cl.
*G06F 12/00* (2006.01)
(52) U.S. Cl. ..................................................... 702/113
(58) Field of Classification Search .................. 702/113, 702/35, 36, 115, 179, 181, 189, 183, 185; 705/4
See application file for complete search history.

(56) References Cited

U.S. PATENT DOCUMENTS

| | | | | |
|---|---|---|---|---|
| 4,839,823 A | | 6/1989 | Matsumoto | 706/52 |
| 5,128,859 A | | 7/1992 | Carbone et al. | 364/401 |
| 6,167,358 A | * | 12/2000 | Othmer et al. | 702/188 |
| 6,381,561 B1 | | 4/2002 | Bomar, Jr. et al. | 703/8 |
| 6,470,303 B2 | | 10/2002 | Kidd et al. | 703/8 |
| 6,711,495 B1 | | 3/2004 | Ukai et al. | 701/207 |
| 6,885,981 B2 | | 4/2005 | Bomar, Jr. et al. | 703/8 |
| 6,950,013 B2 | | 9/2005 | Scaman et al. | 340/436 |
| 6,975,919 B2 | | 12/2005 | Kluft | 700/177 |
| 7,197,444 B2 | | 3/2007 | Bomar, Jr. et al. | 703/8 |
| 7,239,945 B2 | | 7/2007 | Hiemer et al. | 701/29 |
| 7,359,821 B1 | * | 4/2008 | Smith et al. | 702/113 |
| 7,502,772 B2 | * | 3/2009 | Kidd et al. | 706/48 |
| 2003/0200123 A1 | * | 10/2003 | Burge et al. | 705/4 |
| 2004/0148188 A1 | | 7/2004 | Uegaki | 705/1 |
| 2004/0243368 A1 | | 12/2004 | Hiemer et al. | 703/8 |
| 2007/0106474 A1 | * | 5/2007 | Ide | 701/301 |

OTHER PUBLICATIONS

U.S. Appl. No. 11/519,560, filed Sep. 12, 2006, entitled "Method And Apparatus For Obtaining Photogrammetric Data To Estimate Impact Severity," by Scott D. Kidd and Darrin A. Smith.

(Continued)

*Primary Examiner*—Michael P. Nghiem
*Assistant Examiner*—Cindy H Khuu
(74) *Attorney, Agent, or Firm*—Trop, Pruner & Hu, P.C.

(57) ABSTRACT

In one embodiment, the present invention includes a computer-implemented method for receiving information regarding a vehicle involved in an accident, determining availability of event data recorder (EDR) data from the vehicle based on the information, and if the EDR data is available, assigning a level of suitability for data collection from the EDR based at least in part on a type of the EDR and information regarding the accident.

22 Claims, 6 Drawing Sheets

OTHER PUBLICATIONS

U.S. Appl. No. 11/363,421, filed Feb. 27, 2006, entitled "Method And Apparatus For Obtaining And Using Impact Severity Triage Data," by Scott D. Kidd and Darrin A. Smith.

U.S. Appl. No. 10/166,866, filed Jun. 11, 2002, entitled "Methods And Apparatus For Using Black Box Data To Analyze Vehicular Accidents," by Darrin A. Smith and Scott Palmer.

European Patent Office, International Search Report And Written Opinion For International Application. No. PCT/US07/13215, 8 pages, Jan. 31, 2008.

U.S. Patent and Trademark Office, Office Action Mailed Nov. 15, 2007 for U.S. Appl. No. 11/363,421, 17 Pages Total.

U.S. Patent and Trademark Office, International Search Report And Written Opinion For International Application. No. PCT/US07/04410, 7 pages, Feb. 26, 2008.

U.S. Appl. No. 12/069,603, filed Feb. 12, 2008, entitled "Methods And Apparatus For Using Black Box Data To Analyze Vehicular Accidents," by Darrin A. Smith and Scott Palmer.

PCT/US2007/13214 International Search Report with Written Opinion of the International Searching Authority Mailed Sep. 19, 2008.

* cited by examiner

METHOD AND APPARATUS FOR OBTAINING AND USING EVENT DATA RECORDER TRIAGE DATA

This application claims priority to U.S. Provisional Patent Application No. 60/811,973 filed on Jun. 8, 2006 in the name of Scott D. Kidd and Darrin A. Smith entitled METHOD AND APPARATUS FOR OBTAINING AND USING EVENT DATA RECORDER TRIAGE DATA.

FIELD OF INVENTION

Embodiments of the present invention relate to vehicular accident investigation and analysis, and more specifically to accessing and analyzing information from an event data recorder of a vehicle(s) involved in the collision using a triage methodology.

BACKGROUND

Organizations such as insurance companies and others have the task of investigating auto accidents to resolve property and injury claims. Some vehicles involved in accidents will have data from an event data recorder (EDR), also known as a "black box". While black box data may be useful in determining the circumstances surrounding a vehicle accident, it can be a costly and time consuming process to obtain such data and analyze the same. For example, an investigator, claims adjuster, insurance company or other entity may need to travel to a vehicle-site to obtain the data. Even if data is obtained, its use may not be suitable for certain purposes. Insurance companies and others need to appropriately allocate resources in the investigation of accidents, and accordingly, the appropriateness of black box data in evaluating an accident may or may not be justified based on a wide variety of circumstances.

SUMMARY

In one aspect of the present invention, a computer implemented method may be used to obtain information regarding a vehicle involved in an accident, along with additional information regarding the accident. Based on this information, it may be determined whether black box data is appropriate for acquisition. That is, in various embodiments a determination may be made as to the appropriateness or potential usefulness of black box data that may be available from one or more vehicles involved in an accident. Furthermore, in some embodiments the determination may be made based, at least in part, on the type of claims that are associated with the accident.

In some embodiments, it may first be determined if the vehicle has EDR data available. If the EDR data is available for the vehicle, next it is to be determined if it is likely to have stored data from the subject accident and whether such data may be helpful to investigate a particular injury, property damage or liability claim. Not all vehicles collect EDR data and not all vehicles that collect EDR data will collect data that is useful on a particular claim issue. Accordingly, the first step in some embodiments may be to assess availability of EDR data and the type of data that is potentially available. Based on the type of EDR, the direction of impact and the type of accident, a vehicle may be evaluated for the availability of the EDR data.

Another aspect of the invention is a computer-implemented method to evaluate the usefulness or applicability of the EDR data that can be read from the vehicle. Based on claim type, accident scenario, data available and other factors, the vehicle can be evaluated for the applicability of the data. Yet another aspect of the invention is a computer-implemented method to allow organization specific evaluation criteria to be used to determine the applicability of the EDR data for a particular investigation.

A still further aspect of the invention is a computer system to create a work assignment to collect the EDR data if the availability and applicability criteria have been met. Such assignment may be communicated to a remote source that performs the data collection.

DETAILED DESCRIPTION

Event data recorder (EDR) data is available on an increasing number, but not all, vehicles to help investigate vehicular accidents. While the data may be available, the data collected by different EDRs will vary from manufacturer to manufacturer and from vehicle to vehicle. Depending on the data that is available from a specific vehicle, the data may be more or less useful in investigating particular aspects of an accident such as impact severity, injury potential, liability issues, and so forth. When the data is useful to investigate and evaluate a particular claim, then someone may need to be assigned to collect the data from the vehicle.

While the scope of the present invention is not limited in this regard, in various embodiments a centralized system, such as a computer system, server, desktop computer or the like at a central location may be used to receive data from a variety of sources and analyze the data to determine the availability/applicability of black box data for a given accident. For example, a service provider may have a system that is configured as a master or server in a client/server architecture so that many remote clients may communicate with the master. For example, insurance companies, accident investigators and others at remote locations may have computer systems that can communicate with the server system, e.g., via the Internet. In this way, the service provider can receive data from a given client regarding a particular accident and determine, based on a technique in accordance with an embodiment of the present invention, the availability/applicability of black box data for the particular accident. Furthermore, in making this determination, client-specific information, e.g., previously obtained information, may be used in making the determination.

Figure 1:
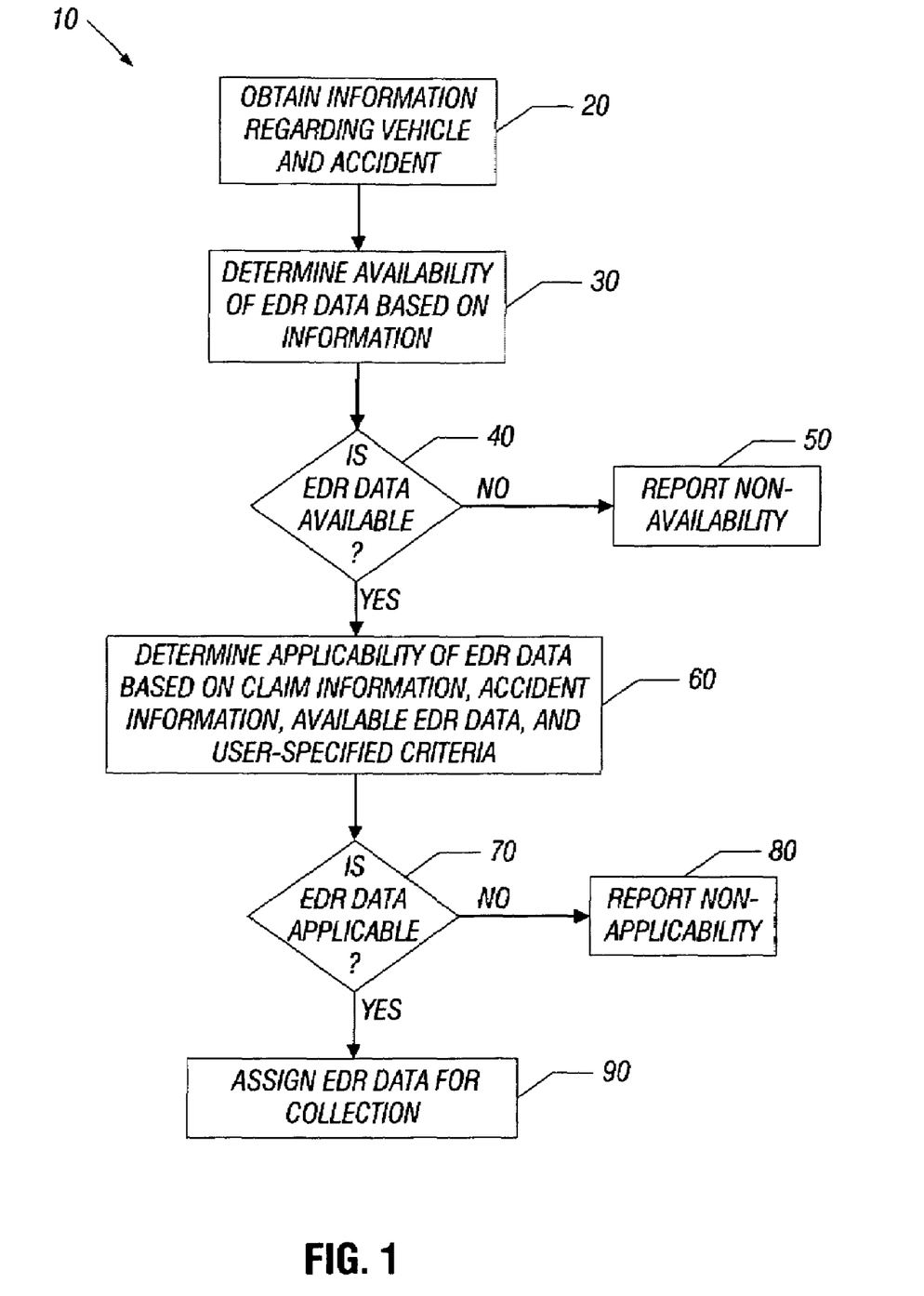
FIG. 1 is a flow chart of a method of analyzing an accident in accordance with an embodiment of the present invention.

Referring now to FIG. 1 shown is a flow chart of a method of analyzing an accident to triage availability/applicability of EDR data in accordance with an embodiment of the present invention. As shown in FIG. 1, method 10 may begin by obtaining information regarding a vehicle involved in an accident, along with information regarding the accident itself (block 20). For example, information identifying the vehicle may be obtained, as well as accident information including the number of vehicles involved, the type of accident (e.g., head on, side impact and so forth), among other such information associated with the accident. Based on this information, availability of the EDR data may be determined (block 30). For example, using the vehicle information it may be determined whether an EDR is present in the vehicle, along with the type of EDR, if present. Furthermore, the availability determination may also take into account factors regarding the accident, such as obtained by analysis of the type of EDR with the type of accident. Thus it may be determined whether EDR data is available for this particular accident (diamond 40). If not, non-availability of EDR data may be reported (block 50). For example, a user such as a client insurance company or other may be informed of the non-availability of suitable EDR data for the particular accident.

Referring still to FIG. 1, if it is determined that EDR data is available, control passes to block 60. At block 60, the applicability of the EDR data may be determined based on various instructions, including claim information, the accident information, the available EDR data, and user specific criteria. For example, claim information associated with the accident, such as different claim types for which a claim is being made, may be analyzed with respect to the type of accident, the type of EDR data available, and even various user specified criteria. Such criteria may include thresholds below which an insurance company or other client may not be interested in further analyzing a given accident.

Based on the determination made in block 60, control passes to diamond 70, where it may be determined whether the EDR data is applicable. If not, the non-applicability of the EDR data may be reported, e.g., to a user (block 80). If it is determined that the EDR data is applicable, an assignment may be made to instruct an entity to obtain the EDR data from the vehicle (block 90). Furthermore, a centralized system that performs the method of FIG. 1 may further store in a file or other location the received information so that it may pre-fill various fields used in an accident analysis program with at least some of the information. In this way, EDR data may be selected for acquisition if a given determination indicates that it is appropriate to obtain the EDR data based on parameters of the EDR data, along with potential liability based on claim information. While shown with this particular implementation in the embodiment of FIG. 1, it is understood that the scope of the present invention is not limited in this regard.

Figure 2A:
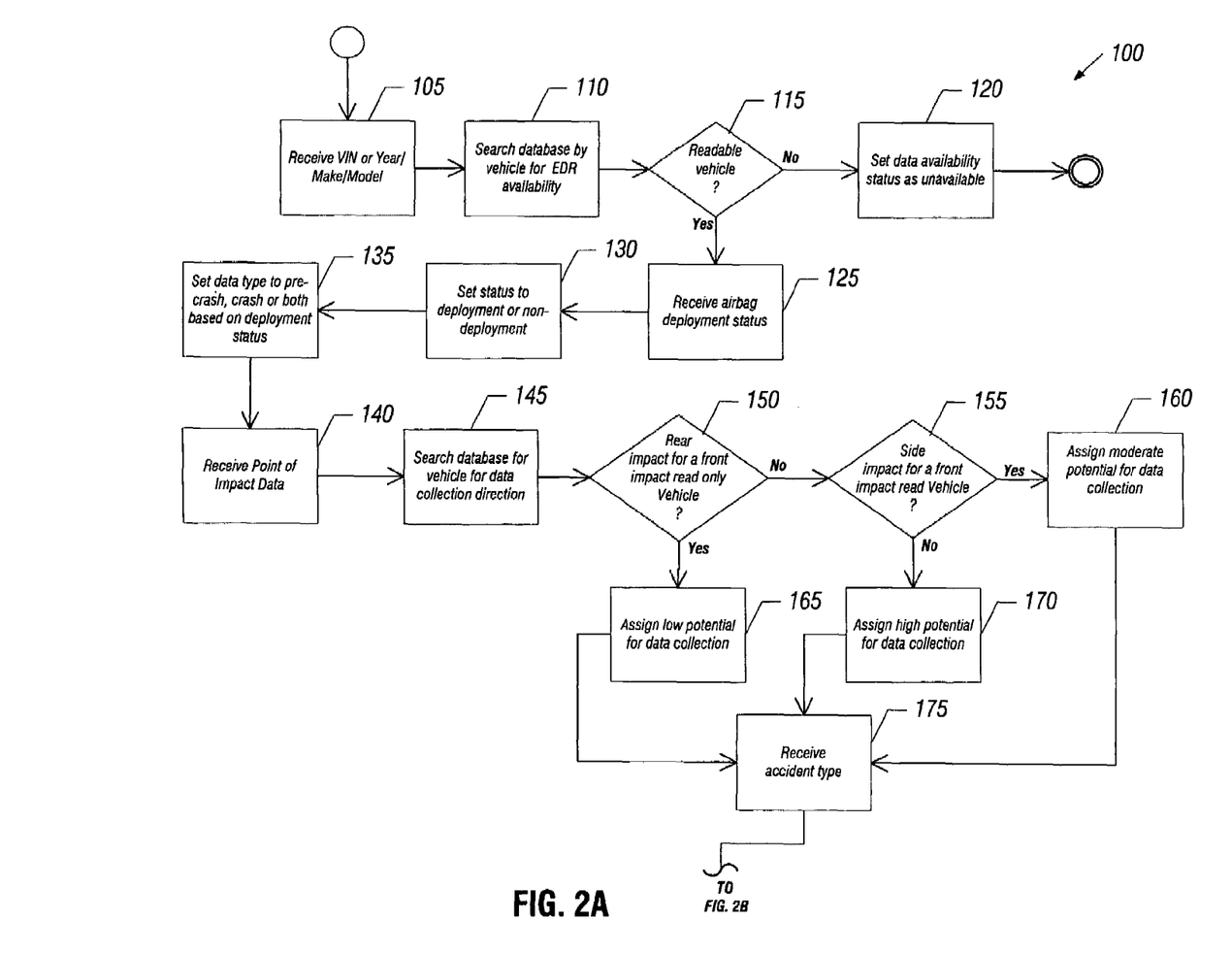
FIGS. 2A and 2B are flow charts of a method to evaluate availability of EDR data in accordance with one embodiment of the present invention.
Figure 2B:
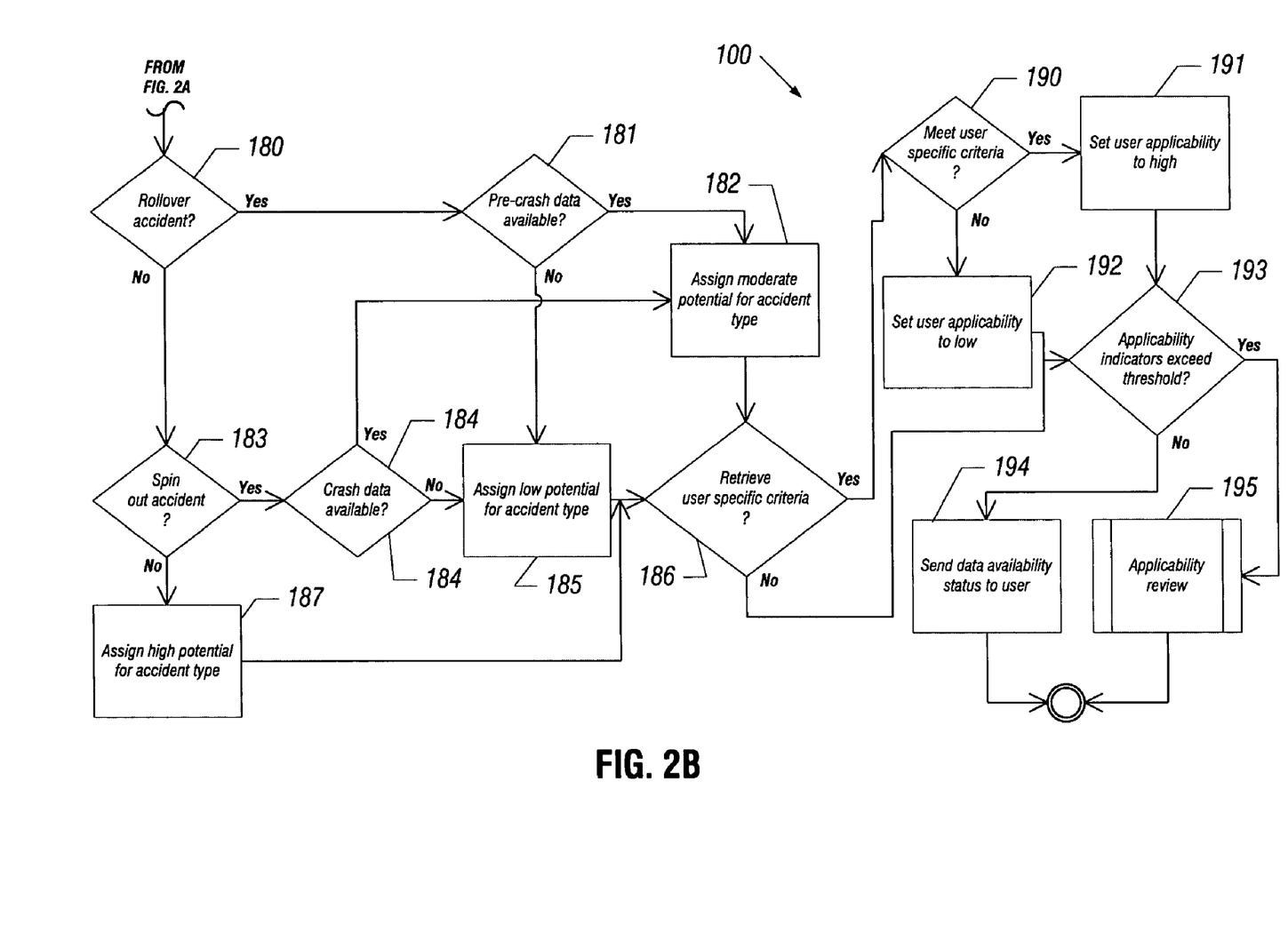

Referring now to FIGS. 2A and 2B, shown is a flow diagram of an EDR data availability triage method in accordance with one embodiment of the present invention. As shown in FIG. 2A, method 100 may be used to triage incoming data, which may correspond to a claim file for a vehicle accident. This triage process may be performed according to a rules-based software package in some embodiments. As shown in FIG. 2A, method 100 may begin by receiving VIN or Year/Make/Model as shown in block 105. Such VIN or Year/Make/Model information may be received from various sources including, for example, an insurance company, a claims adjuster, a software program that documents and values component damage, a software program that documents the insurance claim or other such sources. This information may be received at various locations. In many implementations, method 100 may be implemented at a central location e.g., at an insurance company site or other such entity (and more particularly via a computer system at this central location). Accordingly, method 100 may be implemented in a client/server model in which the VIN or Year/Make/Model information is transmitted by a client system to a server system for analysis, although the scope of the present invention is not so limited.

Still referring to FIG. 2A, the VIN can be decoded or Year/Make/Model data can be used to search a database to determine EDR availability (block 110). Using information obtained, it may be determined if the vehicle has readable EDR data by EDR identification at decision diamond 115 to thus determine if the vehicle has readable data. If the vehicle does not have readable data, control is passed to block 120 and the vehicle is designated as EDR unavailable, which may be reported to a user. If the vehicle does have readable data, control is passed to block 125 to receive airbag deployment status data, in some embodiments from a computer system. In other embodiments, the adjuster or others may be presented a question to provide the airbag deployment status data. The type of event (i.e., whether the airbag deployed or not) may determine if data is available or what type of data is available. Control is passed to block 130 to set the event status based on the deployment status. Control is then passed to block 135 to evaluate the data type that is available based on the event type. For example, the vehicle may have data just before the collision (i.e., pre-crash data), it may have only data during the crash (i.e., crash data) or it may have both depending on the type of EDR and type of event.

Still referring to FIG. 2A, control is passed to block 140 to receive point of impact data, in some embodiments from a computer system. In other embodiments, the adjuster or others may be presented a question or series of questions to provide the point of impact data. Control is passed to block 145 to retrieve information about the direction from which the EDR collects data during the crash. Control is then passed to decision diamond 150 to evaluate the point of impact, specifically a rear impact, relative to the data collection capability with regard to direction for a vehicle that only collects data when there is a front collision. As an example, if a vehicle is struck in the rear but it is designed to detect impacts from the front, the vehicle may not collect any data even though it has an EDR. The vehicle may collect different data depending on whether the airbag deploys in the accident or not. If it is a rear impact for a vehicle that only collects data when there is a front impact, control is passed to block 165 to assign a low score for data collection for this vehicle and accident.

If it is not a rear collision, then control is passed to decision diamond 155 to evaluate the point of impact, specifically a side impact, relative to the data collection capability with regard to direction for a vehicle that only collects data when there is a front collision. If it is a side impact for a vehicle that only collects data when there is a front impact, control is passed to block 160 to assign a moderate score for data collection for this vehicle and accident. If it is not a side collision, then control is passed to block 170 to assign a high score for data collection for this vehicle and accident.

Still referring to FIG. 2A, the characteristics of the accident may also affect the data that is collected. Control is passed to block 175 to receive information about the type of accident or accident description data, in some embodiments from a computer system. In other embodiments, the adjuster or others may be presented a question or series of questions to provide accident characteristics data. As an example, if the vehicle rolls over during the collision, it may not collect any useful data, depending on the data that the EDR normally collects. The accident characteristics can be evaluated for availability of EDR data. From block 175, control is passed to decision diamond 180 (shown in FIG. 2B) to determine if the accident was a rollover. If the accident was a rollover accident, then control is passed to decision diamond 181 to determine whether the EDR has pre-crash data. If the vehicle does have pre-crash data, control is passed to block 182 to assign a moderate score for accident type for this vehicle and accident and control is subsequently passed to diamond 186. If the vehicle does not have pre-crash data as evaluated in decision diamond 181, then control is passed to block 185 to assign a low score for accident type for this vehicle and accident and control is subsequently passed to diamond 186.

If the accident type was not a rollover as determined in decision diamond 180, then control is passed to decision diamond 183 to determine whether this accident involved a spin out of the vehicle including the EDR. If the vehicle did not spin out, control is passed to block 187 to assign a high score for this accident type, and control then passes to diamond 186. If the EDR vehicle did spin out, then control is passed to decision diamond 184 to determine whether crash data is available for this vehicle. If crash data is not available for this vehicle, then control is passed to block 185 to assign a low score for this accident type for this vehicle and accident, and control is subsequently passed to diamond 186. If crash data is available, then control is passed to block 182 to assign a moderate score for accident type for this vehicle and accident, and control is subsequently passed to diamond 186.

Still referring to FIG. 2B, there may be characteristics of particular vehicles or criteria of a specific user that may be evaluated to determine if the data should be collected based on the data availability. As an example, a company such as an insurance company or other entity may make a decision not to collect data from a particular model because of the data available and its relative usefulness. Decision diamond 186 retrieves any user specific criteria for applicability (e.g., no Ford vehicles before 2007 model year). If there are no user specific criteria, then control is passed to decision diamond 193. If there are user specific criteria, then control is passed to decision diamond 190 to evaluate whether the vehicle, EDR data, accident type or other criteria meet the user specific criteria.

If the data meets the user specific criteria, then control is passed to block 191 to assign a high score for the user specific criteria for this vehicle and accident, and control is subsequently passed to decision diamond 193. If the data does not meet user specific criteria, then control is passed to block 192 to assign a low score for user specific criteria for this vehicle and accident, and control is subsequently passed to decision diamond 193.

Still referring to FIG. 2B, each user may have a different threshold for when they want to collect EDR data. For example, different users may have different thresholds as to when they would pursue data collection based on an availability score. If the data availability score does not exceed a user specific threshold, for example, the vehicle may not be selected for further evaluation or for data collection assignment. As an example, one company may want to collect data only if all availability indicators (i.e., data collection, accident type and company specific) are high, while others may collect data if one indicator is moderate, and so forth. Decision diamond 193 evaluates the indicators with respect to such user specific thresholds. If the indicators meet the user's criteria, then control may pass to block 195 to evaluate the available data for the applicability of the data for the claim, as will be described below with regard to FIGS. 3A and 3B. If instead the indicators do not meet the user's criteria, then control is passed to block 194 to send applicability status and indicators to a user, e.g., a client company. This status may indicate that, based on the user's own criteria and actual vehicle and accident information, EDR data, if available, may not be warranted for obtaining and analysis. Of course, the status and indicators may also be sent in the event it is determined that available EDR data exists. Also, it is to be understood that while shown with only these particular criteria, both of an EDR and an accident, additional data may exist in an EDR, both available EDRs and future EDRs. Accordingly, in many embodiments additional information regarding an accident and corresponding criteria of the EDR may be analyzed to determine availability of EDR data with respect to such criteria.

Figure 3A:
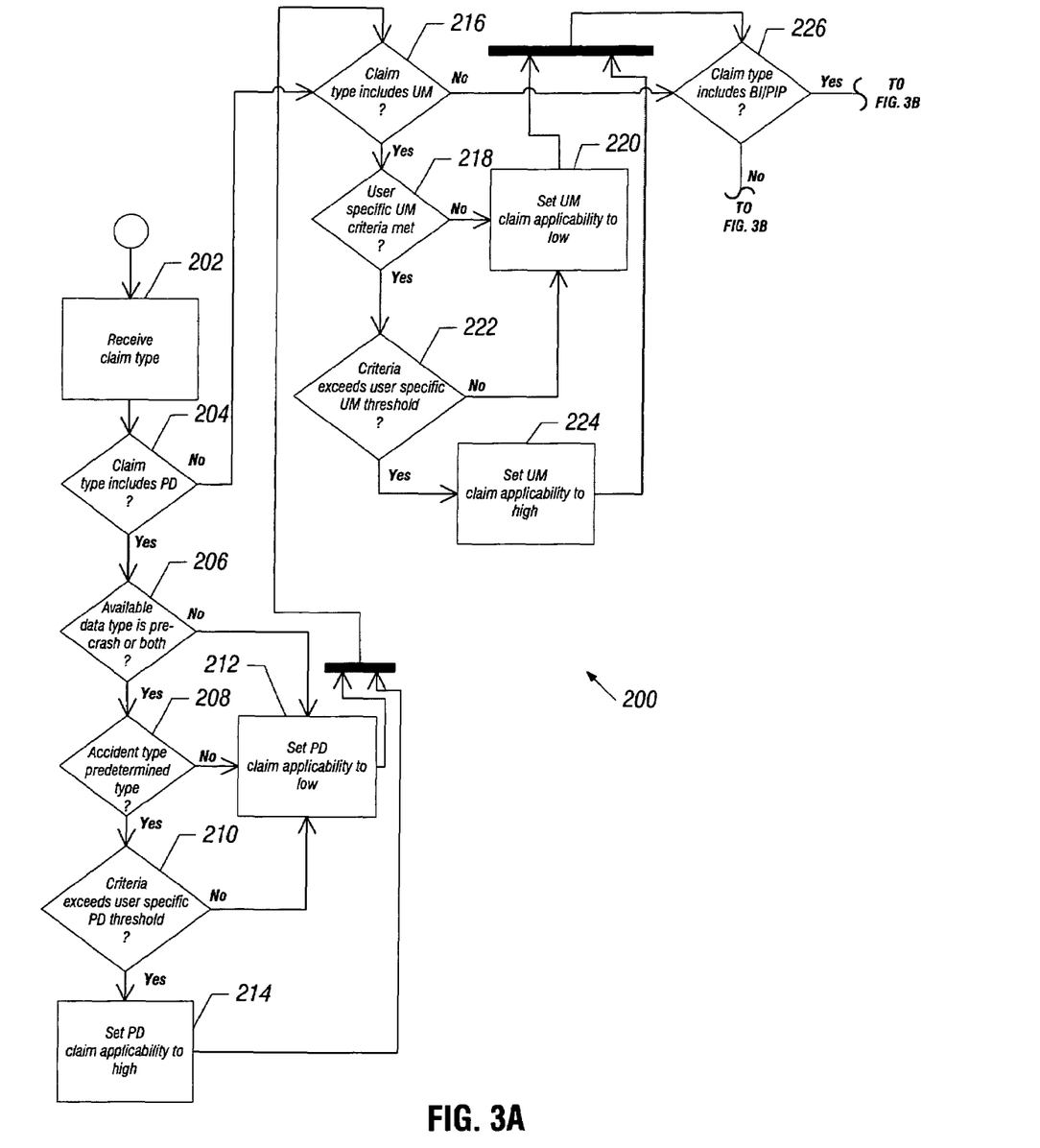
FIGS. 3A and B are flow charts of a method to evaluate applicability of EDR data in accordance with one embodiment of the present invention.
Figure 3B:
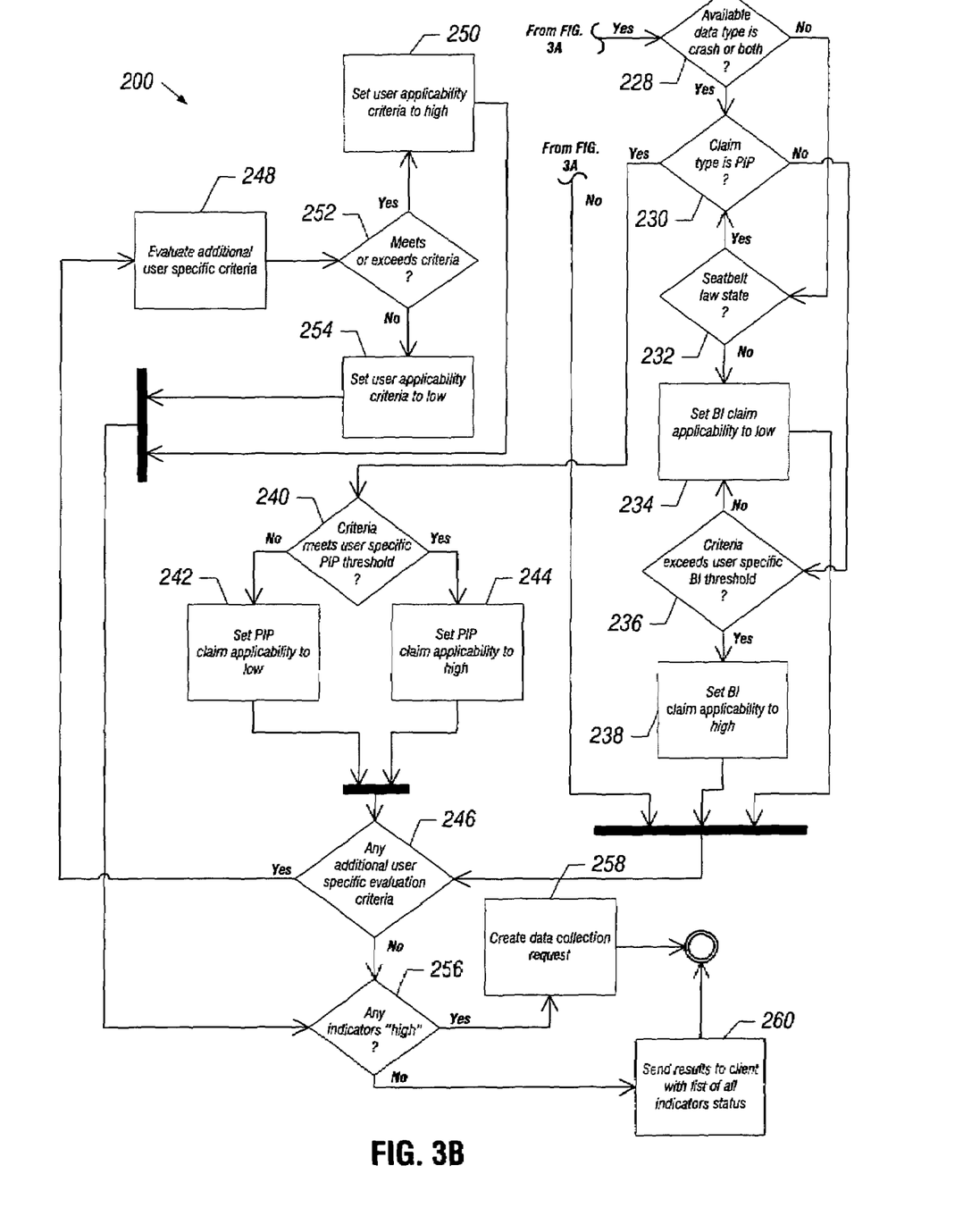

Referring now to FIGS. 3A and 3B, shown is a flow diagram of a method in accordance with an embodiment of the present invention for evaluating the usefulness of the EDR data that is available for a particular vehicle. As shown in FIG. 3A, method 200 may be implemented by a computer, such as a server in a central location (e.g., of an insurance company or other such entity). Block 202 shows the receipt of a claim type. The claim may be for one or more of property damage to the vehicle (PD), uninsured motorist (UM), bodily injury (BI), or personal injury protection (PIP), as examples. Control is passed from block 202 to decision diamond 204 to determine if a PD claim has been made. If the claim includes a PD claim, control is passed to decision diamond 206. Decision diamond 206 determines if pre-crash data is available. That is, it may be determined if the EDR data that is available includes pre-crash information such as speed or the like. In some embodiments, instead of determining for presence of actual data, the determination may be based on whether a given EDR is able to collect and store pre-crash information. If no pre-crash data is available, control is passed to block 212 to score the claim as low for PD applicability. Control is subsequently passed to decision diamond 216.

If pre-crash data is available, then control is passed to decision diamond 208 to evaluate accident type and determine if the accident type is of a predetermined type (e.g., intersection accident, turning accident, or the like). If so, control is passed to decision diamond 210 to evaluate user specific criteria for PD claims. If the accident type is not of such a type, control is passed to block 212 to score the claim as low for PD applicability. Control is subsequently passed to decision diamond 216.

Decision diamond 210 evaluates any user specific criteria for PD (e.g., reserve amount). For example, a user set threshold may correspond to a dollar amount below which a certain insurance company does not want to further analyze a claim. If the user specific criteria are met (or if there are no user specific criteria), then control is passed to block 214 to score the claim as high for PD applicability. Control is subsequently passed to decision diamond 216. If the user specific criteria are not met, then control is passed to block 212 to score the claim as low for PD applicability. Control is subsequently passed to decision diamond 216.

Still referring to FIG. 3A, if no PD claim is presented (at diamond 204) then control is passed to decision diamond 216. At decision diamond 216, it may be determined whether the claim includes a UM claim. If a UM claim is presented, control is passed to decision diamond 218 to evaluate company specific criteria for a UM claim. If no UM claim is presented, then control is passed to decision diamond 226.

Decision diamond 218 evaluates information to determine the applicability of the UM claim based on user specific criteria. As an example, one company may want to collect EDR data when a phantom vehicle was involved, others may want to collect data when the accident was a single vehicle accident. Of course, other criteria such as whether the accident was not witnessed or the accident was a hit and run may also be used in some embodiments. If the user specific UM criteria are met, then control is passed to decision diamond 222. If instead the user specific UM criteria are not met, then control is passed to block 220 to score the claim as low for UM applicability. Control is subsequently passed to decision diamond 226.

Decision diamond 222 evaluates any user specific criteria for UM (e.g., reserve amount). If the user specific criteria are met (or if there are no user specific criteria), then control is passed to block 224 to score the claim as high for UM applicability. Control is subsequently passed to decision diamond 226. If the user specific criteria are not met, then control is passed to block 220 to score the claim as low for UM applicability. Control is subsequently passed to decision diamond 226.

Still referring to FIG. 3A, if no UM claim is presented (as determined at diamond 216) then control is passed to decision diamond 226. Decision diamond 226 determines whether the claim includes a BI or PIP claim. From diamond 226, control passes to FIG. 3B. More specifically, if a BI or PIP claim is presented, control is passed to decision diamond 228 to evaluate the type of data available. If no BI or PIP claim is presented, then control is passed to decision diamond 246.

Decision diamond 228 determines if crash data is available. The determination of crash data may be based on actual EDR data available or information identifying a type of EDR present, for example. If no crash data is available, control is passed to decision diamond 232 to determine if a seatbelt law applies in the jurisdiction where the accident occurred. If crash data is available then control is subsequently passed to decision diamond 230 to determine if the claim is a PIP claim.

If a seatbelt law applies as evaluated by decision diamond 232, then control is passed to decision diamond 230 to determine if the claim is a PIP claim. If a seatbelt law does not apply, then control is passed to block 234 to score the claim as low for BI and PIP applicability. Control is subsequently passed to decision diamond 246. Still referring to FIG. 3B, decision diamond 230 determines if a PIP claim has been presented. If a PIP claim has been presented, then control is passed to decision diamond 240 to evaluate company specific criteria with respect to PIP claims. If no PIP claim has been presented, then control is passed to decision diamond 236.

Decision diamond 240 evaluates the PIP claim with respect to user specific criteria (e.g. reserve amount, etc.). If the user specific criteria are met, control is passed to block 244 to score the claim as high for PIP applicability. Control is subsequently passed to decision diamond 246. If the user specific criteria are not met, then control is passed to block 242 to score the claim as low for PIP applicability. Control is subsequently passed to decision diamond 246.

Still referring to FIG. 3B, decision diamond 236 evaluates any user specific threshold with respect to the BI claim (e.g., reserve amount or other company criteria). If the BI claim meets the user specific criteria, control is passed to block 238 and the BI claim is set to a high applicability score and control is subsequently passed to decision diamond 246. Otherwise, control is passed to block 234 to score the BI claim as low applicability and control is subsequently passed to decision diamond 246.

Decision diamond 246 checks for any user specific evaluation criteria with respect to the claim (e.g., all claims resulting in a death must have EDR data, all claims for policy limits, etc.) If there are user specific evaluation criteria, control is passed to block 248 and the claim(s) is evaluated with respect to the criteria and control is subsequently passed to decision diamond 252. If the claim(s) meets the user supplied criteria, control is passed to block 250 and the user applicability criteria are set to high. Control is subsequently passed to decision diamond 256. If the user criteria are not met at diamond 252, then the user applicability criteria is set to low as shown in block 254 and control is subsequently passed to decision diamond 256.

If there are no user specific criteria, control is passed from diamond 246 to decision diamond 256 to check if any of the indicators are scored as high applicability. If any indicators are high, control is subsequently passed to block 258 to create a data collection assignment request for EDR data collection and analysis. Subsequently, this assignment request information may be sent to a client claim management system or directly to a vendor providing the data collection service. In this event, an adjuster may then initiate a request with the vendor or complete information on a previously generated request with partial information to complete the data collection assignment process. In some implementations, the information obtained in the methods of FIGS. 2A and 2B and FIGS. 3A and 3B may be used to pre-fill fields of vehicle accident analysis software of, e.g., a centralized system, that can be later be used for analysis of the received EDR data, along with other information regarding the accident to analyze various features of the accident. Thus a data file may be generated to store this information, so that when the EDR data is later received, it may be associated with this file, which may then be read by the software to perform analysis of the accident. If no indicators are high, the control is passed to block 260 to store the status results and send results to the client. Furthermore, while not shown in the embodiment of FIGS. 3A and 3B, in the event that one or more indicators are high, status results may be sent to the client in this case also.

Figure 4:
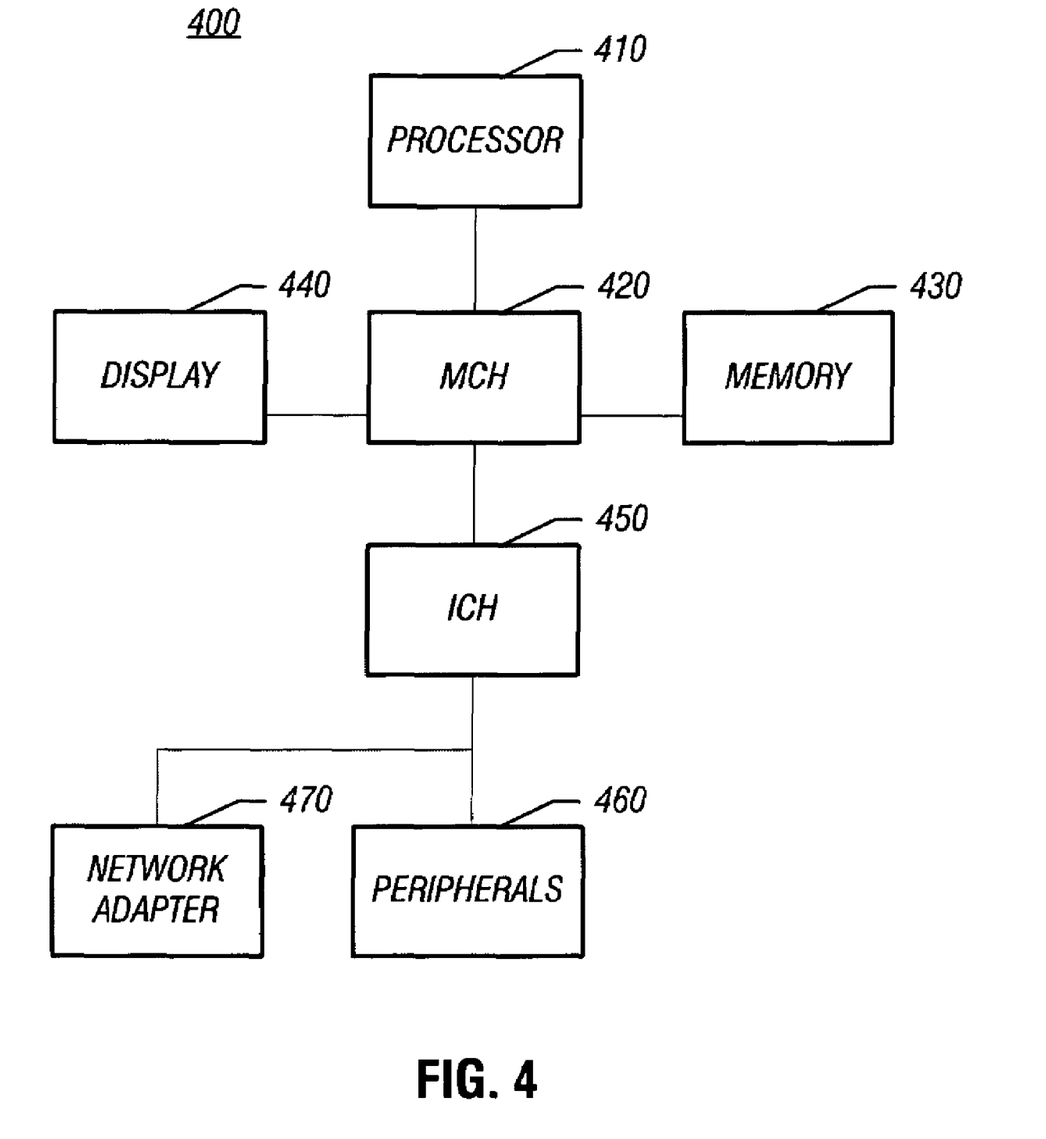
FIG. 4 is a block diagram of a system in accordance with an embodiment of the present invention.

Referring now to FIG. 4, shown is a block diagram of a system in accordance with one embodiment of the present invention. As shown in FIG. 4, system 400 may be a computer system, such as a personal computer, server computer or other such system. System 400 may include a processor 410, which may be a microprocessor such as a central processing unit. Processor 410 is coupled via a memory controller hub (MCH) 420 that in turn is coupled to a memory 430 and a display 440, which may be a flat panel display, for example. During operation, memory 430 may store software in accordance with an embodiment of the present invention that includes instructions to perform the various techniques described herein.

As further shown in FIG. 4, MCH 420 is coupled to an input/output controller hub (ICH) 450. In turn, ICH 450 may be coupled to various peripherals 460 and a network adapter 470. Network adapter 470 may be used to communicate between system 400 and one or more other computers via a computer network, such as a local area network (LAN), a wide area network (WAN), or a wireless network, such as a wireless LAN (WLAN). Furthermore, network adapter 470 may communicate with remote systems, such as computers of an insurance company or other third party that desires to send vehicle and accident information to system 400 for triage and/or processing in accordance with an embodiment of the present invention. Such communication may be via the Internet or another such computer network. In some implementations, these communications may be made secure, e.g., via encryption or in another secure format.

Accordingly, system 400 may receive incoming accident data from one or more sources and process the data to obtain a triage report indicative of whether EDR data is available/applicable for analysis of the accident. This triage report may be sent back to the one or more sources for their further use, such as for initiating obtaining of the actual EDR data from the subject vehicle(s). Furthermore, the triage report and the data from the incoming accident data may be stored in a database, e.g. of system 400 for further analysis, e.g., with regard to impact severity or liability assessment for the accident, such as may be performed on receipt of the actual EDR data. While described with this particular implementation in the embodiment of FIG. 4, is to be understood that the scope of the present invention is not so limited and other systems may be used to implement embodiments of the present invention.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A computer-implemented method comprising:
receiving information regarding a vehicle involved in an accident in the computer;
determining, in a processor of the computer, availability of event data recorder (EDR) data from the vehicle based on the information before data collection from the EDR; and
if the EDR data is available, determining in the processor applicability of the EDR data for an investigation of the accident based at least in part on claim information associated with the accident, at least one user-specified criteria with respect to the claim information, the at least one user-specified criteria including a threshold below which a user may not be interested in obtaining the EDR data, and a type of the EDR, and assigning a level of suitability for the data collection from the EDR based at least in part on the type of the EDR and the claim information associated with the accident.

2. The method of claim 1, further comprising reporting to the user a result of the assigning to cause an assignment to be made to instruct an entity to obtain the EDR data from the vehicle, wherein the level of suitability comprises a multi-level result.

3. The method of claim 1, wherein determining the availability comprises searching a database based on the information received to obtain EDR configuration information including at least one of presence of the EDR, deployment type for the EDR, and impact direction type for the EDR.

4. The method of claim 3, further comprising receiving accident information associated with the accident including point of impact information, and accident type information.

5. The method of claim 4, further comprising assigning the level of suitability based on analysis of the accident information and the EDR configuration information.

6. The method of claim 1, further comprising receiving the user-specified criteria regarding claim threshold information and determining the level of suitability based on analysis of the claim information and the user-specified criteria.

7. A computer-implemented method comprising:
receiving claim information regarding a claim for an accident involving at least one vehicle and receiving information regarding the vehicle and accident information regarding the accident;
determining, in a processor, availability of event data recorder (EDR) data from the vehicle based on the information before data collection from the EDR; and
if the EDR data is available, determining in the processor applicability of the EDR data for an investigation of the accident based at least in part on the claim information associated with the accident, at least one user-specified criteria with respect to the claim information, the at least one user-specified criteria including a threshold below which a user may not be interested in obtaining the EDR data, and a type of the EDR, and assigning a level of suitability for the data collection from the EDR based at least in part on the type of the EDR and the claim information.

8. The method of claim 7, further comprising reporting to a client a result of determining the applicability, wherein the client comprises an insurance company at a remote location to a central system in which the method is performed.

9. The method of claim 7, further comprising determining if at least one of the plurality of claim types meets the threshold based on the claim information, and if so analyzing the applicability of the available EDR data.

10. The method of claim 9, wherein the threshold comprises a monetary level for the corresponding claim type.

11. The method of claim 10, further comprising reporting to a client inapplicability of the EDR data if a claim amount for a corresponding claim type is below the monetary level.

12. The method of claim 7, further comprising reporting that the EDR data is applicable if analysis of any of a plurality of claim types is at a high level.

13. The method of claim 7, further comprising generating a report file associated with the claim and indicating in the report file each of a plurality of claim types for which the EDR data is determined to be applicable.

14. The method of claim 7, further comprising sending an assignment to a remote entity to instruct the remote entity to obtain the EDR data if the EDR data is determined to be applicable.

15. The method of claim 14, further comprising pre-filling a data file with at least a portion of input information for a vehicle accident analysis program based on the claim information.

16. The method of claim 15, further comprising associating EDR data obtained responsive to the assignment with the data file.

17. A computer-readable medium comprising computer-readable instructions that when executed enable a system to:
obtain vehicle information and accident information regarding a vehicle accident in the system;
determine, in the system, if event data recorder (EDR) data is available for the vehicle accident based on analysis of the vehicle information and the accident information before data collection from the EDR; and
if so, determine applicability of the EDR data based on claim information regarding the vehicle accident and the accident information, at least one user-specified criteria with respect to the claim information, the at least one user-specified criteria including a threshold below which a user may not be interested in obtaining the EDR data, and a type of the EDR, and assign a level of suitability for the data collection from the EDR based at least in part on the type of the EDR and the claim information.

18. The computer-readable medium of claim 17, further comprising instructions that enable the system to report the applicability of the EDR data to a user.

19. The computer-readable medium of claim 17, further comprising instructions that enable the system to create a claim file associated with the vehicle accident in a database of the system and indicate one or more claim types for which the EDR data is determined to be applicable.

20. The computer-readable medium of claim 17, further comprising instructions that enable the system to determine that the EDR data associated with the vehicle accident is available based on the type of the EDR in the vehicle and type of accident.

21. The computer-readable medium of claim 17, further comprising instructions that enable the system to independently determine applicability of the EDR data for a plurality of claim types and identify applicability via a multi-level applicability analysis.

22. The computer-readable medium of claim 17, further comprising instructions that enable the system to indicate to a user applicability of the EDR data if at least one of multiple claim types exceeds the threshold corresponding to a monetary level.

* * * * *